Aug. 8, 1950     P. W. THORNHILL     2,518,097
SEALING MEANS FOR FLUID PRESSURE APPARATUS
Filed April 9, 1946
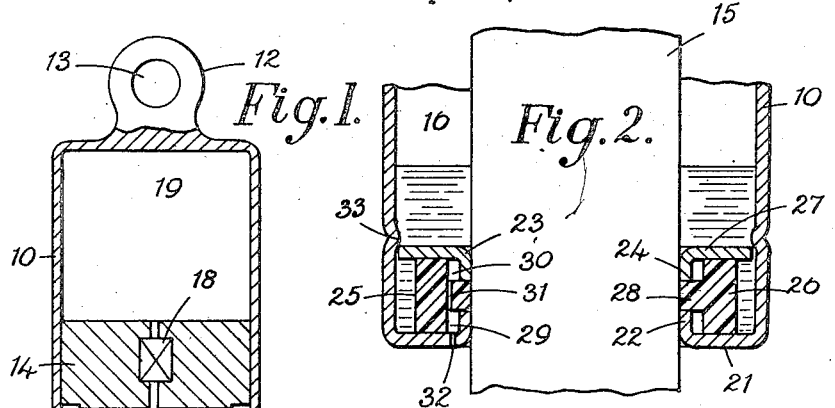
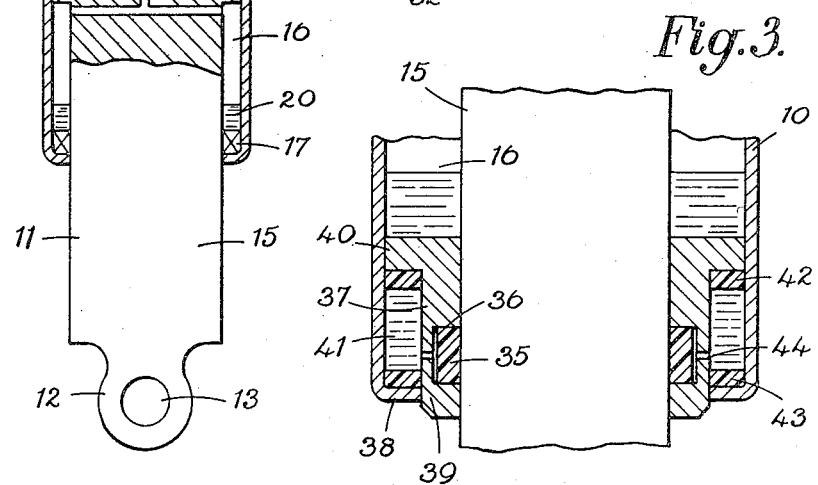
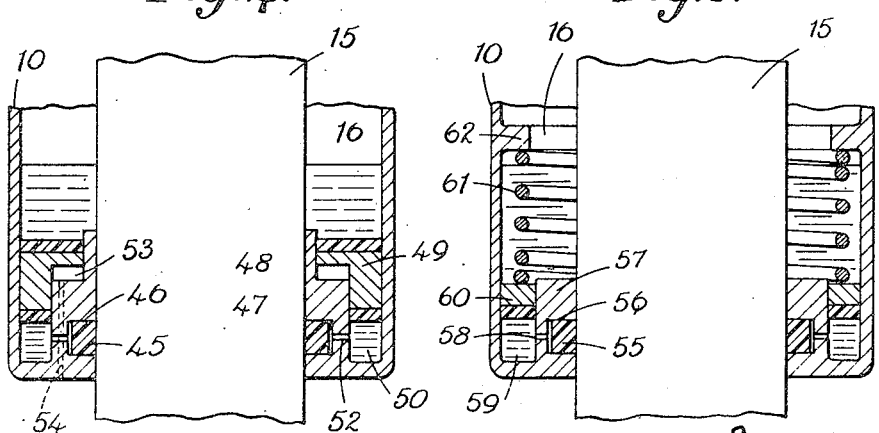
Inventor
Peter Warburn Thornhill
by Stevens and Davis
his attorneys

Patented Aug. 8, 1950

2,518,097

UNITED STATES PATENT OFFICE 2,518,097

SEALING MEANS FOR FLUID PRESSURE APPARATUS

Peter Warborn Thornhill, Leamington Spa, England, assignor to Automotive Products Company Limited and Levitation Limited, Leamington Spa, England Application April 9, 1946, Serial No. 660,776
In Great Britain January 2, 1945

5 Claims. (Cl. 286—26)

This invention relates to sealing means for fluid pressure apparatus.

In such apparatus it is frequently necessary to provide a fluid seal between a plunger and a cylinder or equivalent parts, and it is the object of the present invention to provide improved sealing means for this purpose.

According to the invention, in sealing means for fluid pressure apparatus of the plunger and cylinder type a sealing ring bearing on the plunger or cylinder is subjected on its face opposite to that which bears on the said part, to fluid pressure varying with the pressure of fluid contained in the apparatus, the said fluid pressure producing a radial pressure of the sealing ring on the said plunger or cylinder greater than the pressure of said contained fluid.

The surface of the sealing ring upon which the fluid pressure acts may be of greater axial width than the surface thereof which bears on the plunger or cylinder, the said surface of greater area being exposed to the contained fluid.

In another arrangement according to the invention the face of the sealing ring opposite to that which bears on the plunger or cylinder is subjected to fluid pressure in a chamber separated from the contained fluid by a piston or equivalent having a greater area exposed to said contained fluid than to the fluid in said chamber, and supported against the pressure of said contained fluid solely by the pressure in said chamber.

In a further arrangement according to the invention the face of the sealing ring opposite to that which bears on the plunger or cylinder is subjected to fluid pressure in a chamber separated from the contained fluid by a piston or equivalent having equal areas exposed to the contained fluid and to the fluid in said chamber, and resilient means are provided which act on the said piston in the same direction as the pressure of said contained fluid.

In one form of sealing means according to the invention the sealing ring is of T shape in cross section, with the "base" of the stem of the T bearing on the plunger or cylinder and the "top" of the head of the T exposed to the contained fluid, and is located axially between abutments each having a flat annular surface engaging the end of the head of the T, and an axially projecting annular rib engaging with the side of the stem of the T.

In another form of sealing means according to the invention the sealing ring is mounted in a circumferential groove in a stepped sleeve defining, with the member (cylinder or plunger) other than that on which the sealing ring bears, a closed annular chamber having a cross sectional area equal to the difference between the cross sectional areas of the two parts of the sleeve, the longer cross sectional area of the sleeve being exposed to the contained fluid, and the closed annular chamber having a fluid connection to the groove containing the sealing ring.

In another form of sealing means according to the invention the chamber separated from the contained fluid is formed between co-axial cylindrical walls of the plunger or cylinder, one of said walls being stepped to receive a portion of the piston or equivalent of greater radial width than the portion of said piston which enters the chamber, said portion of the piston of greater radial width being exposed to said contained fluid.

The invention is hereinafter described with reference to the accompanying drawings, in which:

Figure 1 is a diagrammatic sectional view of a pneumatic suspension unit for a vehicle, showing one application of a sealing means according to the invention;

Figure 2 is a fragmentary view of a part of Figure 1, to a larger scale, showing one form of sealing means according to the invention;

Figure 3 is a view similar to Figure 2, showing another form of sealing means according to the invention; and, Figures 4 and 5 are further views similar to Figure 2 showing other forms of sealing means according to the invention.

Referring to Figure 1 the pneumatic suspension unit comprises a cylinder 10 and plunger 11 each provided with a lug 12 having a hole 13 therein, to receive a pin upon which the unit is pivotally mounted. The plunger 11 has an enlarged head 14 which is a substantially fluid-tight fit in the cylinder, and a stem 15 of smaller diameter projecting through the open end of the cylinder. There is thus an annular space 16 formed between the cylinder 10 and plunger stem 15, this space being closed at the upper end by the plunger head 14, and at the lower end by a sealing device shown diagrammatically at 17, the sealing device being carried in the cylinder and sliding on the surface of the plunger stem. A valve of any convenient type, indicated diagrammatically at 18, controls the passage of air between the annular space 16, and the space 19 above the plunger head, to give the required damping action. A small quantity of liquid lubricant indicated at 20, fills the space immediately above the sealing means, thus ensuring that the sealing means is kept lubricated.

Figure 2 shows the lower end of the cylinder 10, and a short length of the plunger stem 15, one form of sealing means according to the invention being mounted in the cylinder. The end of the cylinder is turned inwardly to form a radial flange 21, the inner edge of which is itself turned upwardly to form a short cylindrical wall 22 which fits closely about the plunger stem 15. An L-section ring 23, of metal, having the same thickness as the cylindrical wall 22, lies in the cylinder, the ring 23 having a cylindrical wall 24 projecting towards the corresponding wall 22. A T-section sealing ring, generally indicated by the reference 25, of rubber-impregnated fabric or other fairly rigid but slightly resilient and flexible material, is positioned between the end of the cylinder and the ring 23, the "head" 26 of the T-section extending between the radial flange 21 of the cylinder and the radial limb 27 of the L-section ring. The "stem" 28 of the T-section ring passes between the ends of the two cylindrical walls 22 and 24, and its "base" bears on the plunger stem 15. The arrangement is such that the ends of the "head" of the T-section ring are in close engagement with the flange 21 and the radial limb of the ring 23, and the "stem" 28 is closely engaged on its opposite sides by the ends of the two cylindrical walls 22 and 24. The annular spaces 29 and 30 between the "head" 26 of the T-section ring and the walls 22 and 24 are vented to the surrounding atmosphere, by passages 31 in the ring itself, and passages 32 in the flange 21. The L-section ring 23 is held in position by internal projections 33 formed on the cylinder wall, there being substantial clearance between the limb 27 of the said ring and the cylinder wall.

Any pressure existing in the annular space 16 between the plunger stem 15 and cylinder 10 acts on the L-shaped ring and presses it firmly against the T-section sealing ring 25, thus in turn pressing the latter against the flange 21 and wall 22 of the cylinder end. The pressure also has access to the radially outer surface of the "head" 26 of the sealing ring, and thus urges it inwardly against the surface of the plunger, the actual pressure of the sealing ring on the plunger surface being greater than the pressure in the annular space 16 in the ratio of the width of the "head" of the T-section to the width of its "stem." The pressure between the sealing ring and the plunger is thus greater than the pressure of the fluid retained by the sealing ring, and a very effective seal is provided.

The sealing ring may be L-shaped instead of T-shaped, the cylinder end being formed as in the previous example, but the ring 23 being replaced by a flat washer.

In the arrangement shown in Figure 3, the sealing ring 35 is of rectangular cross-section, and is mounted in an internal circumferential groove 36 in a stepped sleeve 37, the sealing ring fitting tightly between the side walls of the groove. The cylinder 10 has an inturned end 38 through which the smaller diameter part 39 of the sleeve 37 projects, the larger diameter part 40 of the sleeve being a sliding fit in the cylinder 10, and thus enclosing an annular space 41 between itself and the cylinder end. Sealing rings 42 and 43 of india rubber or the like are arranged at the ends of this space 41, and ports 44 connect the said space to the groove 36 containing the sealing ring. The radial thickness of the smaller part 39 of the sleeve 37 is such that its cross-sectional area is substantially half that of the larger part 40 of the sleeve. The annular space 41 contains liquid and as, due to the conformation of the sleeve 37, the cross-sectional area of this space 41 is substantially half that of the main annular space 16 any pressure existing in the main annular space 16 produces a pressure in the annular space 41 which is twice that in the space 16. The pressure in the space 41 acts on the radially outer face of the sealing ring 35 through the ports 44, and the sealing ring is thus urged against the plunger surface with a pressure substantially twice that of the fluid against which it seals.

Figure 4 shows an arrangement in which the sealing ring 45 is mounted in a groove 46 in a re-entrant wall 47 carried by the cylinder 10, the wall being stepped at 48 so that its inner portion is thinner than its outer portion. A stepped annular piston 49 is disposed between the outer wall of the cylinder and the re-entrant wall, and serves to transmit pressure from the annular space 16 to the annular space 50 between the smaller end of the piston and the end of the cylinder, the pressure in the space 50 being greater than that in the space 16 in the ratio of the areas of the two sides of the piston. The groove 46 containing the sealing ring is connected by radial ports 52 to the annular space 50, and the further annular space 53 between the wall 47 and the piston 49 is vented to atmosphere by a passage 54. Thus, as with the arrangement shown in Figure 3, the sealing ring is subjected on its outer face to a liquid pressure greater than that against which it seals.

Figure 5 shows another arrangement in which a sealing ring 55 is mounted in a groove 56 in a re-entrant wall 57 of the cylinder 10, the groove being connected by ports 58 to the annular space 59 between the re-entrant wall and the main cylinder wall. The piston 60 in this case is a plain annular ring having both faces of the same area, and is acted upon by a spring 61 reacting on an abutment 62 in the cylinder, and tending to urge the piston into the space 59. Liquid in the space 59 is thus maintained at a pressure greater by the value of the spring load than that in the annular space 16, and this pressure acts on the outer face of the sealing ring through the ports 58.

The invention is, of course, applicable to fluid pressure apparatus other than shock absorbers. For example, it may be applied to liquid pressure motor cylinders such as are used for actuating undercarriages and the like devices on aircraft. The sealing ring may, of course, be mounted on a piston or equivalent member, and urged outwardly by the fluid pressure against the wall of a cylinder, any of the arrangements illustrated being capable of adaptation for use in this manner by merely inverting the positions of the various parts in a radial direction.

What I claim is:

1. In fluid pressure apparatus comprising plunger and cylinder elements defining a main fluid pressure chamber, sealing means between said elements for sealing said chamber and comprising a sealing ring bearing on one of said elements, and a movable sleeve mounted in said cylinder surrounding said plunger and separating said main chamber from an auxiliary fluid pressure chamber to which the face of the sealing ring opposite to that which bears on the said element is exposed, said movable sleeve having a greater cross-sectional area exposed to the main chamber than to the auxiliary chamber and being supported against the pressure in the main chamber only by the pressure in the auxiliary chamber, whereby pressure in said auxiliary chamber is maintained at a greater value than the pressure in the main chamber.

2. In fluid pressure apparatus comprising plunger and cylinder elements defining a main fluid pressure chamber, sealing means between said elements for sealing said chamber and comprising a sealing ring bearing on one of said elements, a stepped sleeve slidable in said cylinder element and defining, with the element other than that on which the sealing ring bears, an auxiliary fluid pressure chamber having a cross-sectional area equal to the difference between the cross-sectional areas of the two parts of the sleeve, a groove in said sleeve to contain the sealing ring, and passages connecting the base of said groove to said auxiliary chamber, the stepped sleeve having its larger cross-sectional area exposed to the pressure in the main chamber, and being supported against said pressure only by the pressure in the auxiliary chamber.

3. In fluid pressure apparatus comprising plunger and cylinder elements defining a main fluid pressure chamber, a stepped sleeve mounted between said elements, said sleeve comprising a smaller portion which slidably engages the plunger and projects through the end of the cylinder, and a larger portion within the cylinder which engages the cylinder wall so as to define between itself and the end of the cylinder an auxiliary fluid pressure chamber, an internal groove in the sleeve, a sealing ring mounted in said groove and engaging the plunger surface, and passages in the sleeve connecting the base of said groove to the auxiliary chamber, whereby pressure in the main chamber produces a corresponding greater pressure in the auxiliary chamber, and said greater pressure is exerted on the face of the sealing ring opposite to that which engages the plunger surface.

4. In fluid pressure apparatus comprising plunger and cylinder elements defining a main fluid pressure chamber bounded at one end by an end wall of the cylinder through which the plunger element projects, a re-entrant wall in said cylinder element surrounding the plunger element, an internal groove in said re-entrant wall, a sealing ring mounted in said groove and engaging the surface of the plunger element, a reduced inward extension of said re-entrant wall, a stepped annular piston having its larger portion between said reduced extension of the re-entrant wall and the outer wall of the cylinder and its smaller portion between the main part of said re-entrant wall and the outer wall of the cylinder and defining an auxiliary fluid pressure chamber between its smaller portion and the end of the cylinder and passages connecting said chamber to the base of the groove containing the sealing ring whereby pressure in the main chamber produces a corresponding greater pressure in the auxiliary chamber, and said greater pressure is exerted on the face of the sealing ring opposite to that which engages the plunger surface.

5. In fluid pressure apparatus comprising plunger and cylinder elements defining a main fluid pressure chamber, sealing means between said elements for sealing said chamber and comprising a sealing ring having a sealing surface bearing on one of said elements, a stepped sleeve slidable in said cylinder and surrounding said plunger, the surface of the stepped sleeve of larger cross sectional area being exposed to the main fluid pressure chamber defined by the plunger and cylinder elements, and said sleeve, with the surface of said sleeve of smaller cross sectional area as one wall, defining, with the element other than that on which the sealing ring bears, an auxiliary fluid pressure chamber to which the face of the sealing ring opposite to its sealing surface is exposed, said stepped sleeve being supported against the pressure in the main chamber only by pressure in said auxiliary chamber whereby the pressure in said auxiliary chamber is maintained at a greater value than that in the main chamber.

PETER WARBORN THORNHILL.

REFERENCES CITED

The following references are of record in the file of this patent:

UNITED STATES PATENTS

| Number | Name | Date |
|---|---|---|
| 528,773 | Ellis | Nov. 6, 1894 |
| 1,107,327 | Lewis | Aug. 18, 1914 |
| 1,320,736 | Chapman | Nov. 4, 1919 |
| 1,585,864 | Joyce | May 25, 1926 |
| 1,836,381 | McNale | Dec. 15, 1931 |
| 1,918,697 | Gruss | July 18, 1933 |
| 1,925,562 | Mendenhall et al. | Sept. 5, 1933 |
| 2,098,121 | Wilkinson | Nov. 2, 1937 |
| 2,155,628 | Williams | Apr. 25, 1939 |
| 2,193,587 | Fortune et al. | Mar. 12, 1940 |
| 2,240,644 | Facht | May 6, 1941 |
| 2,370,964 | Janette | Mar. 6, 1945 |